Oct. 27, 1936.    I. MIYAMOTO    2,058,486
SYSTEM MEASURING SMALL MUTUAL INDUCTANCES
Filed Dec. 8, 1934
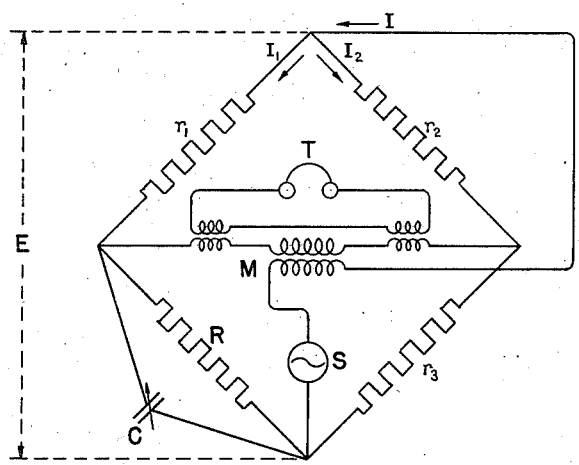
ITARU MIYAMOTO
INVENTOR
BY R.C. Hopgood
ATTORNEY Patented Oct. 27, 1936

2,058,486

UNITED STATES PATENT OFFICE 2,058,486

SYSTEM MEASURING SMALL MUTUAL INDUCTANCES

Itaru Miyamoto, Shimokamo, Kyoto, Japan, assignor to Sumitomo Electric Wire & Cable Works Limited, Osaka, Japan Application December 8, 1934, Serial No. 756,576
In Japan December 13, 1933

1 Claim. (Cl. 175—183)

This invention relates to the improvement in the system for measuring small mutual inductances between wires or coils, and its object is to measure such small mutual inductances in a simple and precise way. The characteristic features of this invention are that a variable condenser is connected in parallel with each of one or two of four resistor arms forming a bridge, and two wires or coils to be measured are connected with the receiver and source circuit respectively.

The attached drawing is a schematic representation of an embodiment of the invention.

There have hitherto been Maxwell, Carey Foster and Hughes-Raileigh's bridge etc., for the measurement of mutual inductances, but with any of them it is difficult to measure such small inductances as between conductors in communication cables. As high frequency telephones have recently come into general use, there has been an increasing necessity of measuring mutual inductances between conductors in cables for such telephone use.

This invented system is for the measurement of the small mutual inductances as aforesaid in an easy way.

The following explanation is made of the drawing:—

A bridge is constructed with four resistor arms, $r_1$, $r_2$, $r_3$ and $(R)$; a small variable condenser $(C)$ is connected with the resistor $(R)$ in parallel; two coils, the mutual inductance between which is to be measured, are connected with receiver $(T)$ circuit and source $(S)$ circuit respectively; and two repeating coils are connected with the receiver circuit. When voltage $(E)$ is fed at the diagonal points of the bridge and, currents $I_1$ and $I_2$ flow in the two arms $r_1$, $r_2$ from the source $(S)$, the relation is as follows:—

$$E = I_2(r_2+r_3) \quad I_2 = \frac{E}{r_2+r_3}$$

$$E = I_1\left(r_1 + \frac{1}{\frac{1}{R}+jC\omega}\right)$$

$$I_1 = \frac{E}{r_1+\dfrac{R}{1+jRC\omega}} = \frac{E}{r_1+\dfrac{R-jR^2C\omega}{1+R^2C^2\omega^2}}$$

$$I = I_1 + I_2$$

M denotes mutual inductance and $\sigma$ denotes its impurity $$(\sigma+jM\omega)I = I_1 r_1 - I_2 r_2$$

$$\sigma+jM\omega = \frac{I_1 r_1 - I_2 r_2}{I} = \frac{\dfrac{Er_1}{r_1+\dfrac{R}{\Delta}-j\dfrac{R^2C\omega}{\Delta}} - \dfrac{Er_2}{r_2+r_3}}{\dfrac{E}{r_1+\dfrac{R}{\Delta}-j\dfrac{R^2C\omega}{\Delta}} + \dfrac{E}{r_2+r_3}}$$

Here $$\Delta = 1 + R^2C^2\omega^2$$

$$\sigma+jM\omega = \frac{r_1(r_2+r_3) - r_2\left(r_1+\dfrac{R}{\Delta}-j\dfrac{R^2C\omega}{\Delta}\right)}{r_1+r_2+r_3+\dfrac{R}{\Delta}-j\dfrac{R^2C\omega}{\Delta}}$$

$$\sigma(r_1+r_2+r_3) + \frac{R\sigma}{\Delta} - j\frac{\sigma R^2C\omega}{\Delta} + jM\omega\left(r_1+r_2+r_3+\frac{R}{\Delta}\right) + \frac{R^2C\omega M\omega}{\Delta} = r_1 r_3 - r_2\frac{R}{\Delta} + j\frac{R^2 r_2 C\omega}{\Delta}$$

As for the imaginary term $(j)$, $$M\omega\left(r_1+r_2+r_3+\frac{R}{\Delta}\right) = \frac{R^2C\omega r_2 + R^2C\omega\sigma}{\Delta}$$

$$\therefore M = \frac{R^2C(r_2+\sigma)}{R+(r_1+r_2+r_3)\Delta} \doteq \frac{R^2Cr_2}{R+r_1+r_2+r_3} \quad (1)$$

As for the real term, $$\sigma\left(r_1+r_2+r_3+\frac{R}{\Delta}\right) = r_1 r_3 - r_2\frac{R}{\Delta} - \frac{R^2C\omega^2 M}{\Delta}$$

$$\sigma = \frac{r_1 r_3 \Delta - r_2 R - R^2C\omega^2 M}{R+(r_1+r_2+r_3)\Delta}$$

$$\frac{r_1 r_3 \Delta - r_2 R}{R+(r_1+r_2+r_3)\Delta} - \frac{R^2C\omega^2 R^2C(r_2+\sigma)}{\{R+(r_1+r_2+r_3)\Delta\}^2}$$

$$\sigma\left[1+\frac{R^4C^2\omega^2}{\{R+(r_1+r_2+r_3)\Delta\}^2}\right] = \frac{r_1 r_3 \Delta - r_2 R}{R+(r_1+r_2+r_3)\Delta} - \frac{R^4C^2\omega^2 r_2}{\{R+(r_1+r_2+r_3)\Delta\}^2}$$

$$\sigma = \frac{(r_1r_3\Delta - r_2R)\{R+(r_1+r_2+r_3)\Delta\} - R^4C^2\omega^2 r_2}{\{R+(r_1+r_2+r_3)\Delta\}^2 + R^4C^2\omega^2}$$

$$= \frac{r_1r_3\Delta R + r_1r_3\Delta(r_1+r_2+r_3)\Delta - r_2R^2 - r_2R(r_1+r_2+r_3)\Delta - R^4C^2\omega^2 r_2}{R^2 + 2R(r_1+r_2+r_3)\Delta + (r_1+r_2+r_3)^2\Delta^2 + R^4C^2\omega^2}$$

$$= \frac{r_1r_3\Delta R + r_1r_3\Delta(r_1+r_2+r_3)\Delta - r_2R^2\Delta - r_2R(r_1+r_2+r_3)\Delta}{R^2\Delta + 2R(r_1+r_2+r_3)\Delta + (r_1+r_2+r_3)^2\Delta^2}$$

$$= \frac{r_1r_3(R+r_1+r_2+r_3) - r_2R(R+r_1+r_2+r_3) + r_1r_3(r_1+r_2+r_3)\Delta - r_1r_3(r_1+r_2+r_3)}{R^2 + 2R(r_1+r_2+r_3) + (r_1+r_2+r_3)^2\Delta}$$

$$= \frac{(r_1r_3 - r_2R)(R+r_1+r_2+r_3) + r_1r_3(r_1+r_2+r_3)R^2C^2\omega^2}{R^2 + 2R(r_1+r_2+r_3) + (r_1+r_2+r_3)^2\Delta}$$

$$\sigma \doteqdot \frac{r_1r_3 - r_2R}{R+r_1+r_2+r_3} + \frac{r_1r_3(r_1+r_2+r_3)R^2C^2\omega^2}{(R+r_1+r_2+r_3)^2} \quad (2)$$

According to the Equation (1), $$M \doteqdot \frac{R^2Cr_2}{R+r_1+r_2+r_3}$$

Therefore M is variable in proportion to C, and when proper values are given to R, C $r_1r_2r_3$, respectively, we have the correct value of M corresponding to the numerical value of C. According to the Equation (2) the value of impurity $\sigma$ can be calculated.

By removing either of two coils wound on a cylinder 14.5 c. m. in diameter against the other, the numerical values of mutual inductance measured in experiment and those in calculation can be compared as follows:

| Distances between coils (c. m.) | 0.5 | 1.0 | 1.5 | 2.0 | 2.5 | 3.5 | 4.5 |
|---|---|---|---|---|---|---|---|
| Measured values (microhenries) | 0.245 | 0.190 | 0.155 | 0.129 | 0.111 | 0.085 | 0.066 |
| Calculated values (microhenries) | 0.253 | 0.188 | 0.153 | 0.129 | 0.110 | 0.083 | 0.065 |

As indicated above, it is affirmed that a precise measurement can be made with this invention.

As this invented system is for the measurement of mutual inductances by comparing with the electrostatic capacity of a variable condenser, it is less influenced by external conditions than the system of measuring by comparing with self-inductance. An instrument having a small variable self-inductance is difficult to make and to regulate, but a small variable condenser can be easily manufactured and regulated, and furthermore, when connected in parallel with the bridge arm resistor, it is less affected by variations in its effective resistance. Thus even a small mutual inductance which has not been measured with any other bridge, can also be measured in thoroughness.

I claim:

An arrangement for measuring small mutual inductances between two inductance elements comprising a Wheatstone bridge circuit having a non-inductive resistor in each of its four arms, a source of current connected across one diagonal of the bridge, a variable condenser connected in parallel with at least one of said non-inductive resistors, means to connect with said source one of said inductance elements and to connect the other of said inductance elements across the other diagonal of said Wheatstone bridge, a receiver, and means to couple said receiver to said other diagonal.

ITARU MIYAMOTO.